US007660843B1

(12) United States Patent
Atkinson et al.

(10) Patent No.: US 7,660,843 B1
(45) Date of Patent: Feb. 9, 2010

(54) METHOD AND APPARATUS FOR DYNAMICALLY DELIVERING A GADGET

(75) Inventors: Olin Sayre Atkinson, Orem, UT (US); Christopher Jean Seiler, Pleasant Grove, UT (US); Boyd "H" Timothy, Provo, UT (US); Dale Allen Lowry, Springville, UT (US); Shawn Matthew Holmstead, Lehi, UT (US)

(73) Assignee: Novell, Inc., Provo, UT (US)

( * ) Notice: Subject to any disclaimer, the term of this patent is extended or adjusted under 35 U.S.C. 154(b) by 796 days.

(21) Appl. No.: 10/349,752

(22) Filed: Jan. 21, 2003

(51) Int. Cl.
*G06F 15/16* (2006.01)
(52) U.S. Cl. ............... 709/203; 709/201; 709/202
(58) Field of Classification Search .......... 709/201–203
See application file for complete search history.

(56) References Cited

U.S. PATENT DOCUMENTS

| 5,717,923 | A | * | 2/1998 | Dedrick ............ 707/102 |
|---|---|---|---|---|
| 5,778,380 | A | | 7/1998 | Siefert |
| 5,797,128 | A | | 8/1998 | Birnbaum |
| 5,983,227 | A | | 11/1999 | Nazem et al. |
| 6,029,245 | A | | 2/2000 | Scanlan |
| 6,061,684 | A | | 5/2000 | Glasser et al. |
| 6,119,078 | A | | 9/2000 | Kobayakawa et al. |
| 6,202,066 | B1 | | 3/2001 | Barkley et al. |
| 6,209,036 | B1 | | 3/2001 | Aldred et al. |
| 6,209,124 | B1 | | 3/2001 | Vermeire et al. |
| 6,240,170 | B1 | | 5/2001 | Shaffer et al. |
| 6,243,717 | B1 | | 6/2001 | Gordon et al. |
| 6,285,978 | B1 | | 9/2001 | Bernth et al. |
| 6,286,001 | B1 | | 9/2001 | Walker et al. |
| 6,311,180 | B1 | | 10/2001 | Fogarty |
| 6,327,628 | B1 | | 12/2001 | Anuff et al. |
| 6,370,498 | B1 | | 4/2002 | Flores et al. |
| 6,381,579 | B1 | | 4/2002 | Gervais et al. |
| 6,389,589 | B1 | | 5/2002 | Mishra et al. |
| 6,408,336 | B1 | | 6/2002 | Schneider et al. |
| 6,415,250 | B1 | | 7/2002 | van den Akker |

(Continued)

FOREIGN PATENT DOCUMENTS

EP     0 975 128     1/2000

(Continued)

OTHER PUBLICATIONS

Sumner Blount, "Secure Portal Management", eAI Journal, May 2000, pp. 44, 46, 48, & 49.

(Continued)

*Primary Examiner*—Nathan Flynn
*Assistant Examiner*—Mohamed Wasel
(74) *Attorney, Agent, or Firm*—Marger Johnson & McCollom, P.C.

(57) ABSTRACT

A portal server requests a gadget from a gadget server. The gadget server makes a copy of the gadget. The gadget server accesses a value to be assigned to a variable for the portal server. The value can be received as part of the request for the gadget, or can be stored on the gadget server, associated with the portal server. Assuming that a policy permits the variable to be assigned the value, any previous value assigned to the variable is overridden. The copy of the gadget is then delivered to the portal server.

17 Claims, 12 Drawing Sheets

U.S. PATENT DOCUMENTS

| | | | |
|---|---|---|---|
| 6,499,030 B1 | 12/2002 | Igata | |
| 6,529,910 B1 | 3/2003 | Fleskes | |
| 6,542,884 B1 | 4/2003 | Soderberg et al. | |
| 6,557,005 B1 | 4/2003 | Burget | |
| 6,560,639 B1 | 5/2003 | Dan et al. | |
| 6,571,241 B1 | 5/2003 | Nosohara | |
| 6,623,529 B1 | 9/2003 | Lakritz | |
| 6,633,742 B1 | 10/2003 | Turner et al. | |
| 6,644,322 B2 | 11/2003 | Webb | |
| 6,704,024 B2* | 3/2004 | Robotham et al. | 345/581 |
| 6,708,172 B1 | 3/2004 | Wong et al. | |
| 6,738,950 B1 | 5/2004 | Barnett | |
| 6,772,146 B2 | 8/2004 | Khemlani et al. | |
| 6,784,883 B1 | 8/2004 | Allor | |
| 6,785,728 B1 | 8/2004 | Schneider et al. | |
| 6,785,866 B1 | 8/2004 | Lewis et al. | |
| 6,789,231 B1 | 9/2004 | Reynar et al. | |
| 6,826,594 B1 | 11/2004 | Pettersen | |
| 6,871,197 B1 | 3/2005 | Johnson | |
| 6,901,367 B1 | 5/2005 | Berstis et al. | |
| 6,925,595 B1* | 8/2005 | Whitledge et al. | 715/513 |
| 6,925,598 B2* | 8/2005 | Melhem et al. | 715/513 |
| 6,941,512 B2 | 9/2005 | Cheng | |
| 6,965,914 B2* | 11/2005 | Dowling | 709/203 |
| 6,975,619 B1 | 12/2005 | Byers et al. | |
| 6,993,554 B2* | 1/2006 | O'Donnell | 709/202 |
| 7,016,977 B1 | 3/2006 | Dunsmoir et al. | |
| 7,085,834 B2 | 8/2006 | Delany et al. | |
| 7,093,198 B1 | 8/2006 | Paatero et al. | |
| 7,149,960 B1 | 12/2006 | Brooks et al. | |
| 7,284,239 B1 | 10/2007 | Young et al. | |
| 2001/0037192 A1 | 11/2001 | Shimamoto et al. | |
| 2002/0002557 A1 | 1/2002 | Straube et al. | |
| 2002/0007330 A1 | 1/2002 | Kumar et al. | |
| 2002/0019839 A1 | 2/2002 | Shiu | |
| 2002/0046245 A1* | 4/2002 | Hillar et al. | 709/205 |
| 2002/0052954 A1 | 5/2002 | Polizzi et al. | |
| 2002/0055989 A1 | 5/2002 | Stringer-Calvert et al. | |
| 2002/0069081 A1 | 6/2002 | Ingram et al. | |
| 2002/0103778 A1 | 8/2002 | Saxena | |
| 2002/0120538 A1 | 8/2002 | Corrie et al. | |
| 2002/0123879 A1 | 9/2002 | Spector | |
| 2002/0129001 A1 | 9/2002 | Levkoff et al. | |
| 2002/0129052 A1 | 9/2002 | Glazer et al. | |
| 2002/0138331 A1* | 9/2002 | Hosea et al. | 705/10 |
| 2002/0147790 A1 | 10/2002 | Snow | |
| 2002/0147801 A1 | 10/2002 | Gullotta et al. | |
| 2002/0149601 A1 | 10/2002 | Rajarajan et al. | |
| 2002/0156902 A1 | 10/2002 | Crandall | |
| 2002/0174150 A1 | 11/2002 | Dang et al. | |
| 2002/0174196 A1 | 11/2002 | Donohoe et al. | |
| 2002/0184321 A1 | 12/2002 | Fishman et al. | |
| 2002/0198971 A1 | 12/2002 | Resnick et al. | |
| 2003/0005002 A1 | 1/2003 | Chen et al. | |
| 2003/0005159 A1 | 1/2003 | Kumhyr | |
| 2003/0020749 A1 | 1/2003 | Abu-Hakima et al. | |
| 2003/0050986 A1 | 3/2003 | Matthews et al. | |
| 2003/0061216 A1 | 3/2003 | Moses | |
| 2003/0105771 A1 | 6/2003 | Tiefenbrun et al. | |
| 2003/0110272 A1 | 6/2003 | du Castel et al. | |
| 2003/0158897 A1 | 8/2003 | Ben-Natan et al. | |
| 2003/0163517 A1* | 8/2003 | Assaf et al. | 709/203 |
| 2003/0191817 A1 | 10/2003 | Fidler | |
| 2003/0195923 A1 | 10/2003 | Bloch et al. | |
| 2004/0034613 A1 | 2/2004 | Purvis et al. | |
| 2004/0098406 A1 | 5/2004 | Roddy | |
| 2004/0123238 A1* | 6/2004 | Hefetz et al. | 715/513 |
| 2004/0193699 A1* | 9/2004 | Heymann et al. | 709/218 |
| 2004/0199603 A1 | 10/2004 | Tafla et al. | |
| 2004/0205118 A1 | 10/2004 | Yu | |
| 2004/0205553 A1 | 10/2004 | Hall et al. | |
| 2004/0205572 A1 | 10/2004 | Fields et al. | |
| 2005/0055630 A1 | 3/2005 | Scanlan | |
| 2005/0097008 A1* | 5/2005 | Ehring et al. | 705/26 |
| 2005/0097190 A1 | 5/2005 | Abdelhak | |
| 2005/0188318 A1* | 8/2005 | Tamir et al. | 715/744 |
| 2006/0004763 A1 | 1/2006 | Horvitz et al. | |
| 2006/0010390 A1 | 1/2006 | Guido et al. | |
| 2006/0101332 A1* | 5/2006 | Imielinski et al. | 715/513 |
| 2007/0180432 A1* | 8/2007 | Gassner et al. | 717/136 |

FOREIGN PATENT DOCUMENTS

| | | |
|---|---|---|
| WO | 9820434 | 5/1998 |

OTHER PUBLICATIONS

Bob King, "All Together Now", Internet World, Aug. 15, 2000, pp. 38-39.

"Portal Building Guide", Yahoo! PortalBuilder TM, Nov. 2001, Software Release 3.5.0.

U.S. Appl. No. 20/020,002, filed Jan. 3, 2002, Straube et al.
U.S. Appl. No. 20/020,052, filed Jun. 19, 2007, Polizzi et al.
U.S. Appl. No. 20/020,103, filed Aug. 1, 2002, Saxena.
U.S. Appl. No. 20/020,129, filed Sep. 12, 2002, Glazer et al.
Wugofski; "CSS Mobile Profile 1.0"; W3C; Oct. 24, 2000; pp. 1-15.

* cited by examiner

METHOD AND APPARATUS FOR DYNAMICALLY DELIVERING A GADGET

RELATED APPLICATION DATA

This application is related to U.S. patent application Ser. No. 10/119,784, titled "Method and Apparatus For Controlling Access to Portal Content From Outside the Portal," filed Apr. 9, 2002, and to U.S. patent application Ser. No. 10/066,465, titled "Method and Apparatus To Dynamically Provide Web Content Resources In a Portal," filed Jan. 30, 2002, both of which are hereby incorporated by reference.

FIELD OF THE INVENTION

This invention pertains to portal web sites, and more particularly to the sharing of content between portal web sites.

BACKGROUND OF THE INVENTION

A portal web site is a site that offers users a central location from which to manage their surfing. The portal web site has links to many of the preferred destinations of the users, and offers tools to simplify their use of the Internet.

Since the first portal web sites were established, their numbers have continued to increase. The incentive behind creating a portal web site is typically financial, both direct and indirect. By having a "captive" audience (captive in the sense that the users typically do not actively seek out alternative portal web sites), advertising revenue is more certain. In addition, the portal web sites can direct users to services that return a greater profit to the owner of the portal web site (either by being a service offered by the owner of the portal web site or by some sort of arrangement with the service provider).

Regardless of which portal web site a customer uses, much of the content the customer typically wants is the same. For example, local, national, and international news are common themes in portal web sites, as are local weather information and sports scores. Only highly specialized portal web sites tend to vary from this norm. Thus, regardless of which portal web site a customer actually uses, the content presented by the portal web site is similar to the content on another portal web site.

Since much of the content offered via different portal web sites is similar, centralization of the content has obvious advantages. If there are fewer sources of content, there are fewer sources that need to be updated (for example, to improve the appearance of the content). Gadgets offer a way to simplify the maintenance and construction of portal web sites. A gadget is a piece of content that can be displayed on a content page. A gadget can occupy the entire page, or it can be only one element of the content page. For example, consider FIG. 1, which shows content page 105. On content page 105 are four gadgets. Weather gadget 110 displays weather forecasts for certain cities, News gadget 115 displays some news headlines to the user, Sports gadget 120 offers links to the latest sports information, and Portfolio gadget 125 gives information about stocks and the major markets. Gadgets 110-125 are all independent, and each can be displayed on a content page independent of any of the others. In this way, the content provider can enable users to select pieces of content that are of interest, and eliminate pieces not of interest. For example, one user might only be interested in News and Portfolio, whereas another user might be interested in only Sports and Weather. Each of these sections (Weather, News, Sports, and Portfolio), if treated as gadgets, can be managed separately and combined for the user as desired. The content provider has the responsibility to combine the content from the gadgets to display to the user. Thus, the content provider is responsible for combining the content from gadgets 110-125 onto a single content page. Gadgets are discussed further in related U.S. patent application Ser. No. 10/119,784, titled "Method and Apparatus For Controlling Access to Portal Content From Outside the Portal," filed Apr. 9, 2002, which is hereby incorporated by reference.

Figure 2:
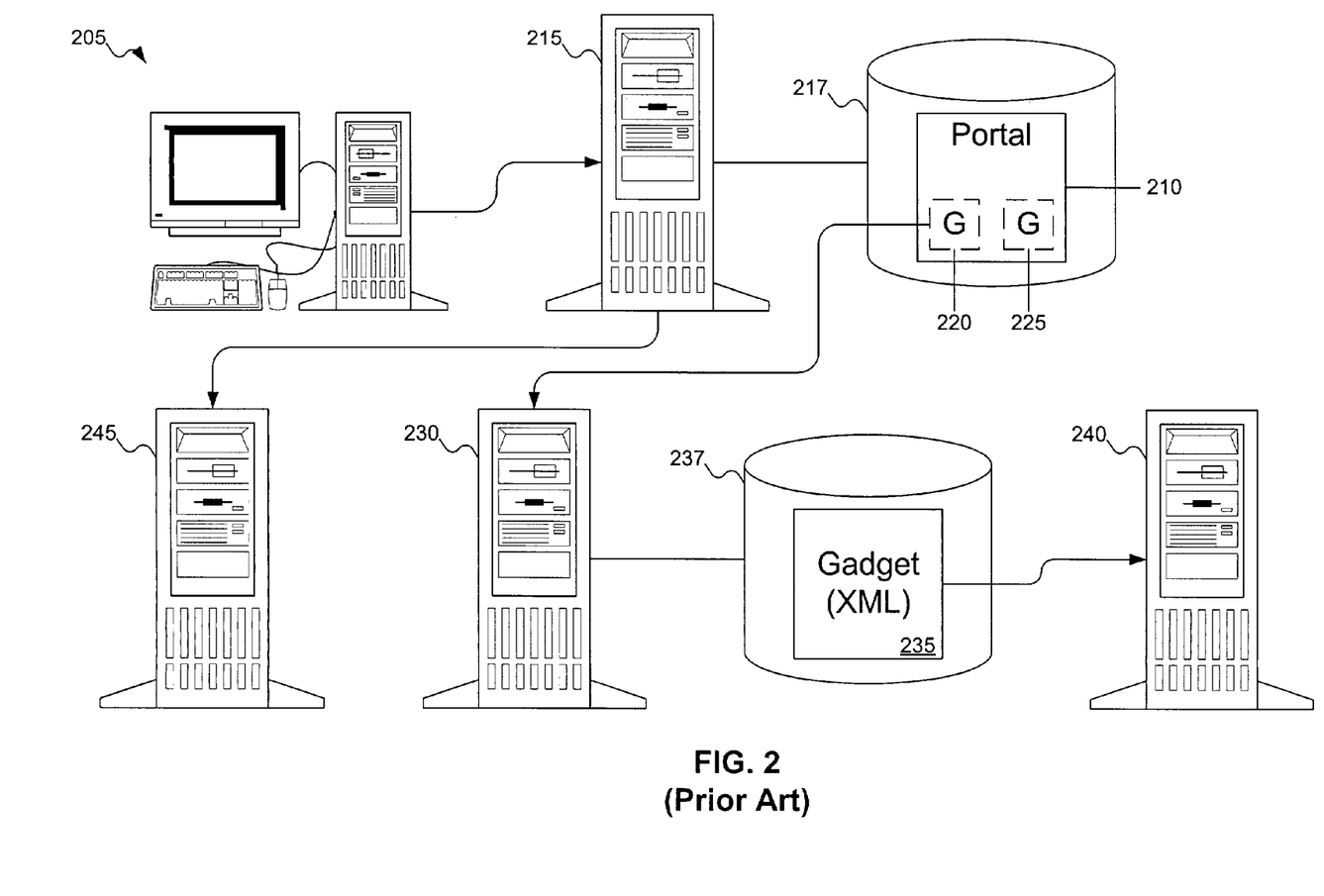
FIG. 2 shows a schematic of a client access data through a portal using gadgets in the prior art.

FIG. 2 shows a schematic of a client access data through a portal web site using gadgets in the prior art. In FIG. 2, client 205 accesses portal web site 210, which happens to be stored on portal server 215 in storage 217. Portal web site 210 includes two gadgets, 220 and 225, which are not stored on portal server 215, but are stored elsewhere. For example, gadget 220 is copied from gadget server 230 as gadget 235, stored in storage 237. Portal web site 210 requests a copy of gadget 235 from gadget server 230, and uses gadget 235 in displaying content drawn from content source 240 to the user. Similarly, gadget 225 can be used to display content from content source 245 (the gadget server storing gadget 225 is not shown in FIG. 2).

Although FIG. 2 shows all the devices being directly connected, typically client 205, portal server 215, gadget server 230, and content sources 240 and 245 are connected by one or more networks not shown in FIG. 2. In addition, a person skilled in the art will recognize that the terms portal server and gadget server are not meant to suggest that machines involved are in any way specialized. They are computers, capable of carrying out particular functions as described herein, but also possibly capable of carrying out other functions. For example, portal server 215 often is a web server offering content to users outside of the portal setting. Similarly, gadget server 230 is not necessarily a server dedicated to providing gadgets to portal web sites: this may simply be one function performed by gadget server 230. In the remainder of this document, the terms portal server and gadget server are intended to refer to the server hosting the portal web site and the server storing gadgets used by the portal web site on the portal server, respectively.

One problem with using gadgets that are remote to the server hosting the portal web site lies in their appearance. The appearance of each portal web site is typically unique to that portal web site. For example, one portal web site might present its content using a particular font or color, different from another portal web site. Or one portal web site might use a particular iconography (symbols for buttons, such as the buttons for scroll bars, minimize and maximize buttons (which enlarge or minimize the display of content), or buttons to eliminate a particular piece of content) peculiar to the portal web site. But the presentation of content in the gadget is determined by the gadget, meaning that the gadget determines the color, font, iconography, etc. If the portal web site uses a presentation scheme different from that used by the gadget, the gadget ruins the coordinated look of the portal web site.

Figure 3:
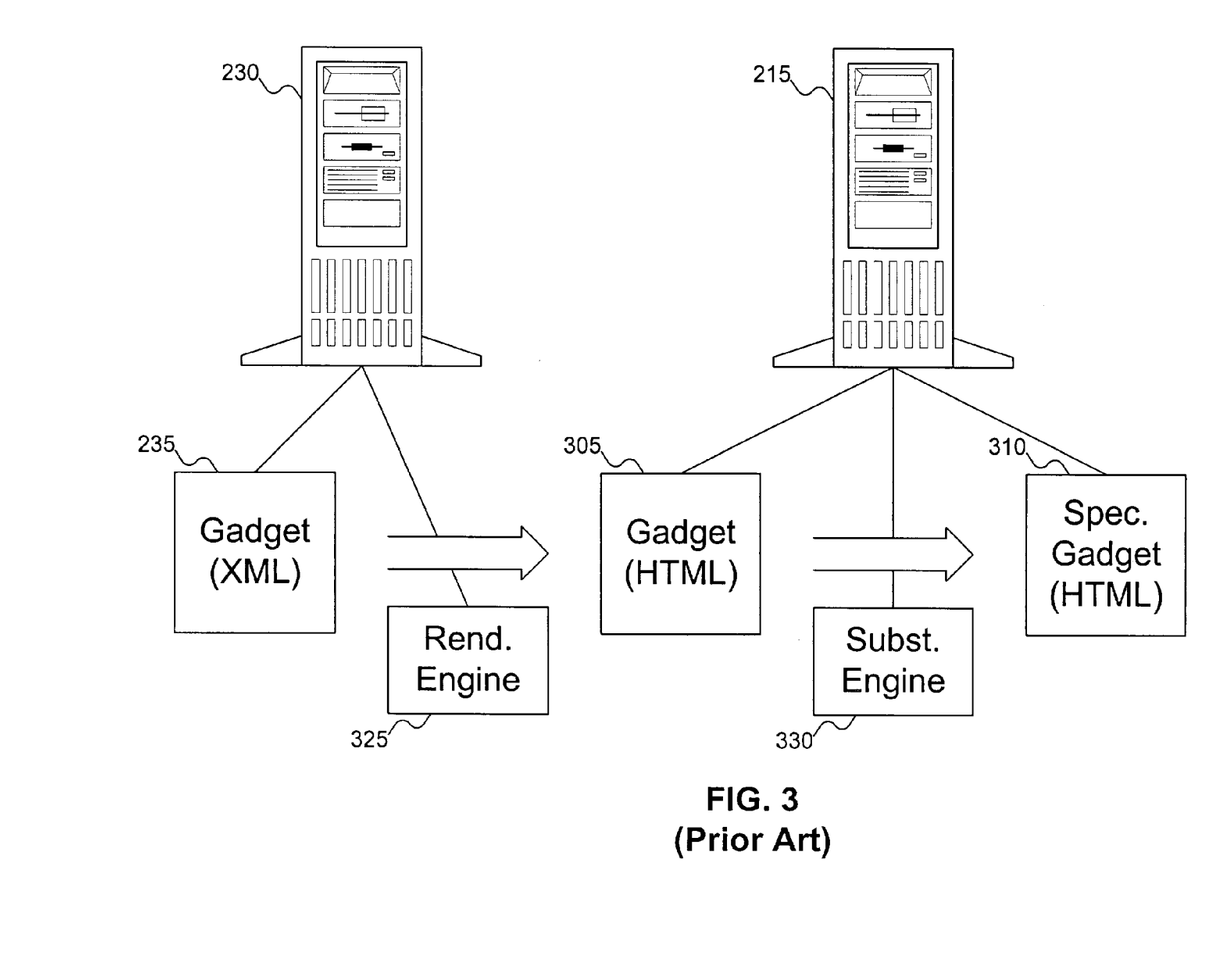
FIG. 3 shows customizing the gadget of FIG. 2 in the prior art.

Although in FIG. 2 gadget 235 is coded using eXtensible Markup Language (XML), before gadget 235 is sent to portal server 215 the gadget is rendered to HyperText Markup Language (HTML). This is shown in FIG. 3. In FIG. 3, gadget 235 is rendered to HTML using rendering engine 325, which is stored on gadget server 230. The rendered gadget 305 is then sent to portal server 215.

Once the gadget has been received by portal server 215, portal server 215 can customize the gadget. In the past, customization was accomplished by performing a search and replace operation on rendered gadget 305 (the version of the gadget coded in HMTL). Portal server 215 would locate particular strings in rendered gadget 305 that needed to be customized and replace them with the customized strings for the portal web site. As shown in FIG. 3, portal server 215 uses substitution engine 330 to substitute the appropriate replacement values in rendered gadget 305. The result of this substitution is specialized gadget 310. Only then could portal server 215 use specialized gadget 310 as part of the portal web site. But this process, especially the search and replace, is very expensive to perform.

A need remains for a way to share content across portal web sites while maintaining a customized look that addresses these and other problems associated with the prior art.

SUMMARY OF THE INVENTION

The invention is a method and apparatus for sharing content between portal web sites. When a request for a gadget is received, a servlet resource manager determines appropriate replacement strings to customize the gadget for the portal server. These strings are assigned to variables in eXtensible Markup Language (XML) before the gadget is rendered to HyperText Markup Language (HTML). Once rendered to HTML, the content is already customized for the portal server. The rendering can be done by the gadget server or by the portal server.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 4:
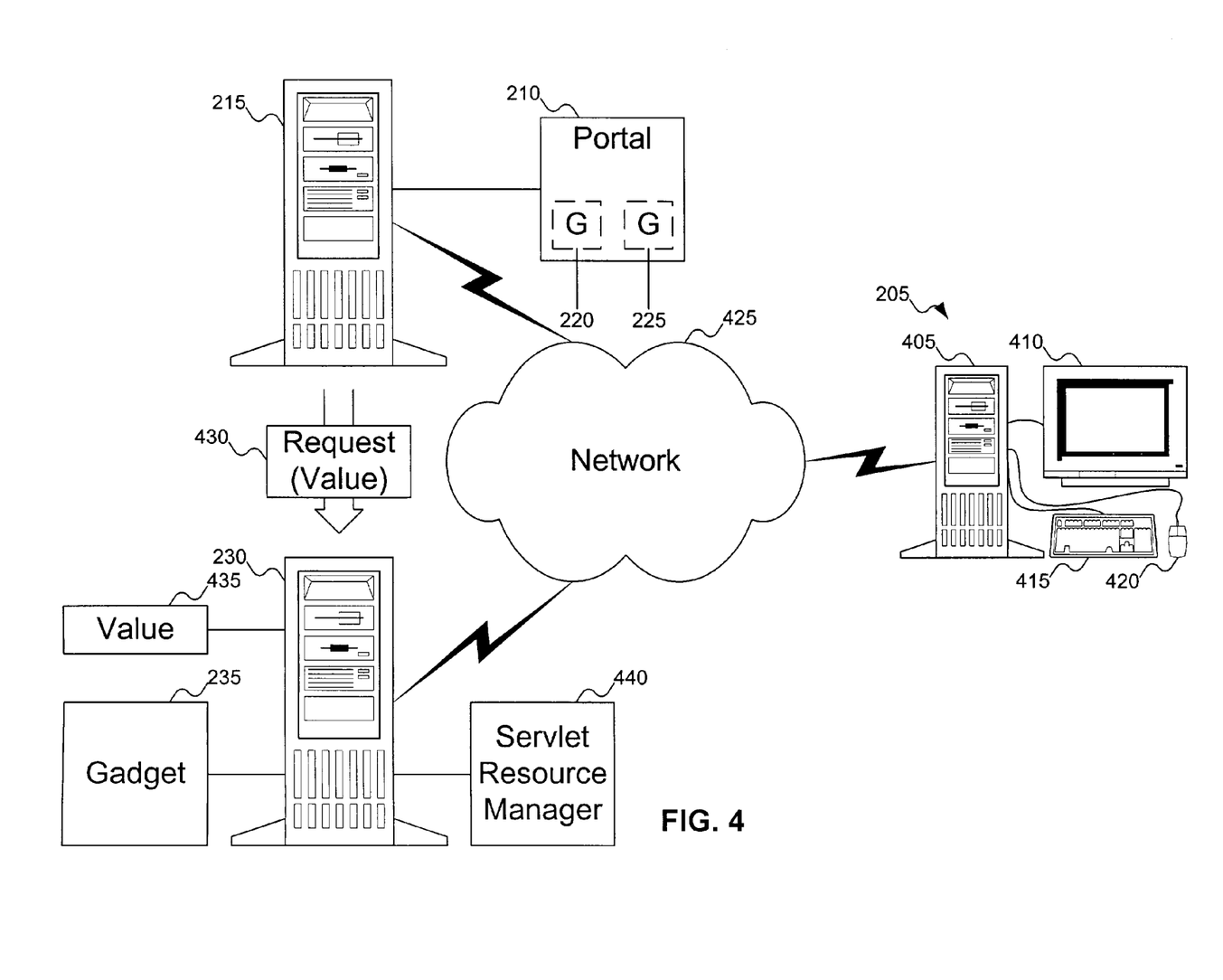
FIG. 4 shows a system for delivering customized content to a portal server, according to an embodiment of the invention.

FIG. 4 shows a system for delivering customized content to a portal server, according to an embodiment of the invention. In FIG. 4, client 205 conventionally includes computer 405, monitor 410, keyboard 415, and mouse 420. A person skilled in the art will recognize that although client 205 is shown as a desktop personal computer, the invention is not limited to any specific type of computer. For example, client 205 can also be an Internet appliance, with monitor 410, keyboard 415, and mouse 420 integrated into the housing of computer 405. Optional equipment not shown as part of client 205 in FIG. 4 are other input/output devices, such as a printer. Client 205 can also take other forms: for example, a handheld device, such as a personal digital assistant (PDA). Also not shown in FIG. 4 are the conventional internal components of client 205: e.g., a central processing unit, memory, file system, etc.

Client 205 is shown connecting to portal server 215 via network 425. Network 425 can be any type of network: a local intranet, an extranet, a local area network (LAN), a wide area network (WAN), a wireless network (utilizing, for example, the Bluetooth or IEEE 802.11 standards), a global network (such as the Internet), or any other variety of network. When client 205 requests to see portal web site 210, portal server 215 begins to assemble the content to present the content to client 205 for display.

Since portal web site 210 uses gadget 220, portal server 215 requests gadget 235 from gadget server 230. (To avoid cluttering FIG. 4, the storages associated with portal server 215 and gadget server 230, which were shown in FIG. 2, are not shown in FIG. 4.) This is shown by request 430. Request 430 requests, with particularity, gadget 235. Request 430 can also include the desired value for some variable in the gadget. Such an approach is useful where portal server 215 requests a gadget relatively infrequently, or when the value for the variable requested by portal server 215 changes frequently. But if the value for the variable requested by portal server 215 is relatively constant and portal server 215 requests the gadget relatively frequently, gadget portal 230 can store the value in a storage (not shown in FIG. 4), as represented by value 435. A person skilled in the art will also recognize other places from which the value can be accessed: for example, gadget server 230 might store the most recent request for gadget 235 from portal server 215 and reuse the values from that request. However the value is determined, servlet resource manager 440 uses the value to set the appropriate variable for gadget 235. This is discussed further below with reference to FIG. 5.

Figure 5:
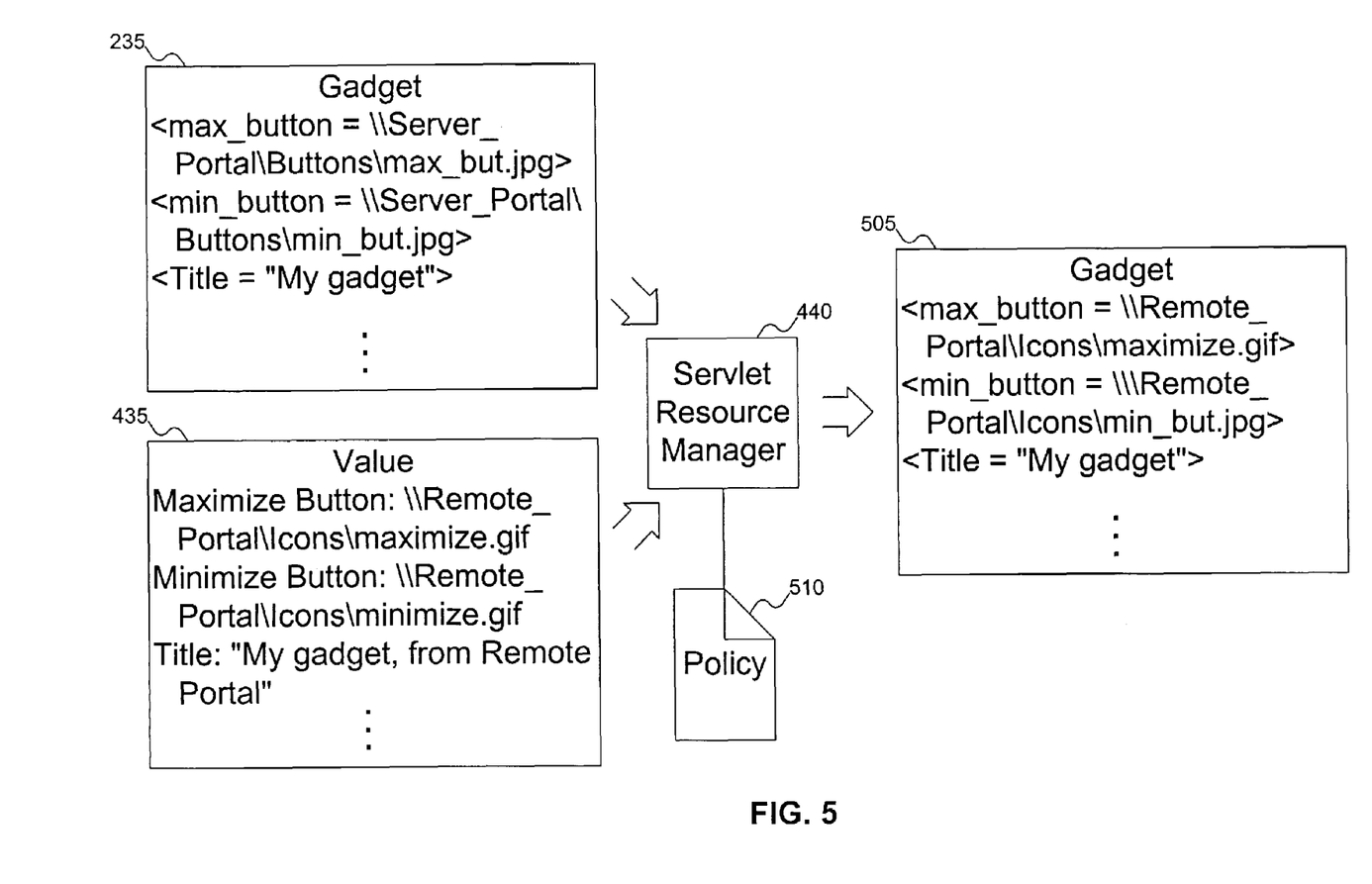
FIG. 5 shows the servlet resource manager of FIG. 4 customizing a gadget before rendering the content to HyperText Markup Language (HTML), according to an embodiment of the invention.

FIG. 5 shows servlet resource manager 440 of FIG. 4 customizing a gadget before the content is rendered to HyperText Markup Language (HTML), according to an embodiment of the invention. In FIG. 5, gadget 235 and value 435 are shown as inputs to servlet resource manager 440. In a preferred embodiment, gadget 235 is stored not in HTML, but rather in eXtensible Markup Language (XML). XML allows for the definition of tags and associated values, whose semantics can be defined by the document itself or by the application that processes the document. XML allows for definitions of tags that HTML does not support. Note that among the tag (also known as a variable) definitions in gadget 235 are definitions for tags identifying, for example, icons for the maximize and minimize buttons used by the gadget. While stored on the gadget server, the tags define the default icons for these tags, currently pointing to files on the gadget server.

Servlet resource manager 440 takes gadget 235 and value 435, which stores the preferred values for the gadget for the portal server, and searches gadget 235 for the variables to be altered. Since the semantics of XML files can be defined at the time the files are rendered to HTML, searching gadget 235 while it is still an XML file is much easier than searching the rendered gadget. Servlet resource manager 440 makes the substitutions for the appropriate tags in gadget 235, resulting in gadget 505. Note that gadget 235 includes variables with values already assigned to them. In addition, if value 435 is to be assigned to a variable not already included in gadget 235, servlet resource manager 440 can add the new variable (and its associated value) to gadget 505 in processing the request for a copy of the gadget received from the portal server.

As shown in FIG. 5, the portal server might request to change the value of more than one tag. Servlet resource manager 440 supports changing as many tag values as needed. Thus, servlet resource manager 440 can replace the values of two or more tags in gadget 235.

Servlet resource manager 440 can also reject a substitution requested by the portal server. For example, in FIG. 5, the portal server has requested a change for the title of the gadget to a more self-serving title. Servlet resource manager 440 might not substitute the new title, and thus the title in gadget 505 would remain unchanged. Servlet resource manager 440 can use policy 510 to determine which value substitutions to make. For example, policy 510 might indicate that color, font, and iconography changes are permitted because such changes relate to the appearance of the gadget when used by the portal web site, but a title change is not permitted as not relating to appearance. A person skilled in the art will recognize how policy 510 can vary to control which values servlet resource manager 440 can change.

Although FIGS. 4 and 5 show only a single servlet resource manager, a person skilled in the art will recognize that there can be more than one servlet resource manager. The servlet resource managers can be allocated however desired. For example, each servlet resource manager can process requests from a single portal server. Or each servlet resource manager can allow different levels of customization of a gadget for a portal server. A person skilled in the art will recognize other ways in which the servlet resource managers can be allocated.

Figure 6A:
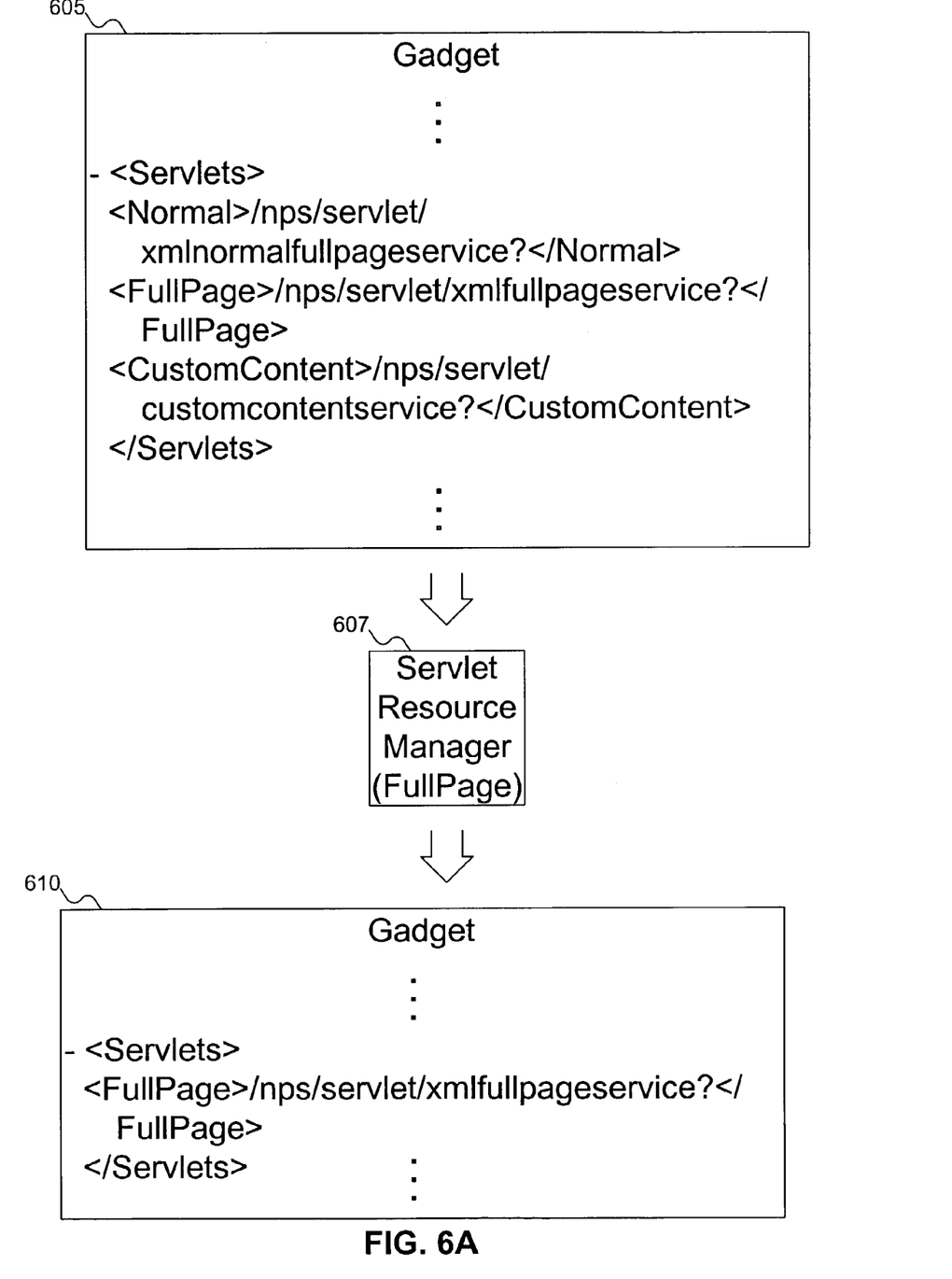
FIGS. 6A-6B show the application of the servlet resource manager of FIG. 4 and the rendering engine of FIG. 3 to render a customized gadget from XML to HTML, according to an embodiment of the invention.

FIGS. 6A-6B show the application of the servlet resource manager of FIG. 4 and the rendering engine of FIG. 3 to render a customized gadget from XML to HTML, according to an embodiment of the invention. As discussed above with reference to FIG. 5, gadgets are preferably represented in the gadget server in XML code. In FIG. 6A, a portion of the XML code that makes up gadget 605 is shown. Gadget 605 lists three different choices for services: The Normal services, the Full Page services, and the Custom Content services. Which service is chosen depends on which servlet resource manager is used. In the example shown in FIG. 6A, the Full Page servlet resource manager is chosen. When Full Page servlet resource manager 607 is applied to gadget 605, customized gadget 610 results.

The reason gadget 605 includes different XML code for different servlet resource managers is that the different servlet resource managers can be applied to gadget 605 depending on the portal servers requesting a copy of gadget 605. For example, the Normal servlet resource manager can be used in processing a request for a copy of gadget 605, unless the request specifies a different servlet resource manager. Or the custom servlet resource manager can be applied when the gadget should return information not in HTML or XML but in any data type, such as in binary when downloading a file. In this case the transform from HTML to XML does not take place. A person skilled in the art will recognize other ways in which the different servlet resource managers can be used.

Full Page servlet resource manager 607 can be selected in several ways. For example, in issuing the request for the copy of gadget 605, the portal server can request the application of the Full Page servlet resource manager. Or the gadget server can store an association between the portal server and full page servlet resource manager 607, so that whenever the portal server requests a copy of gadget 605, servlet resource manager 607 is used.

Figure 6B:
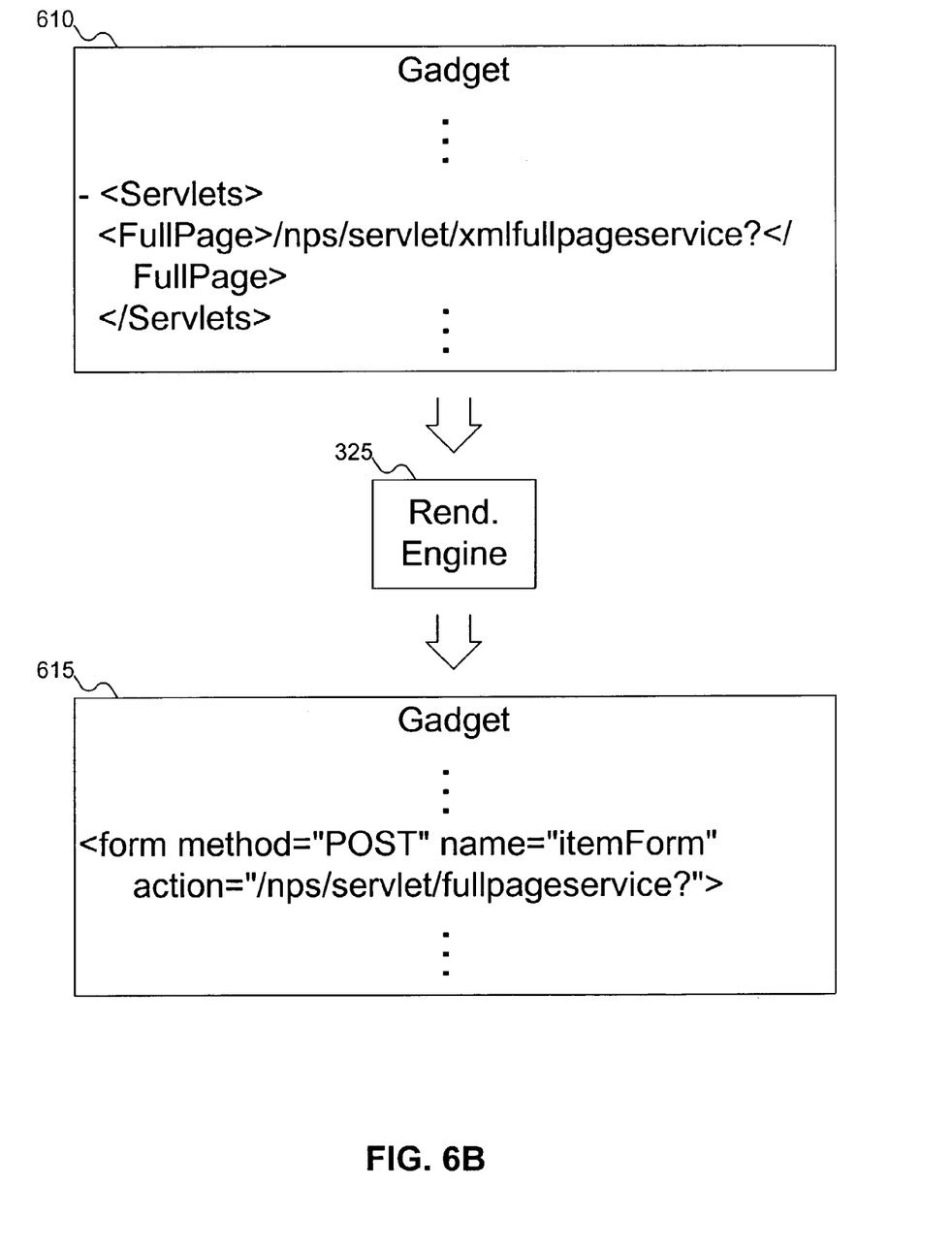

Once the servlet resource manager is finished processing the XML code, the XML code can be rendered to HTML. This process is shown in FIG. 6B. When rendered by rendering engine 325, gadget 610 is transformed from XML to HTML. The result is rendered gadget 615. FIG. 6B shows a portion of the HTML code used to implement rendered gadget 615, which uses the full page service, as selected by the full page servlet resource manager.

Figure 7:
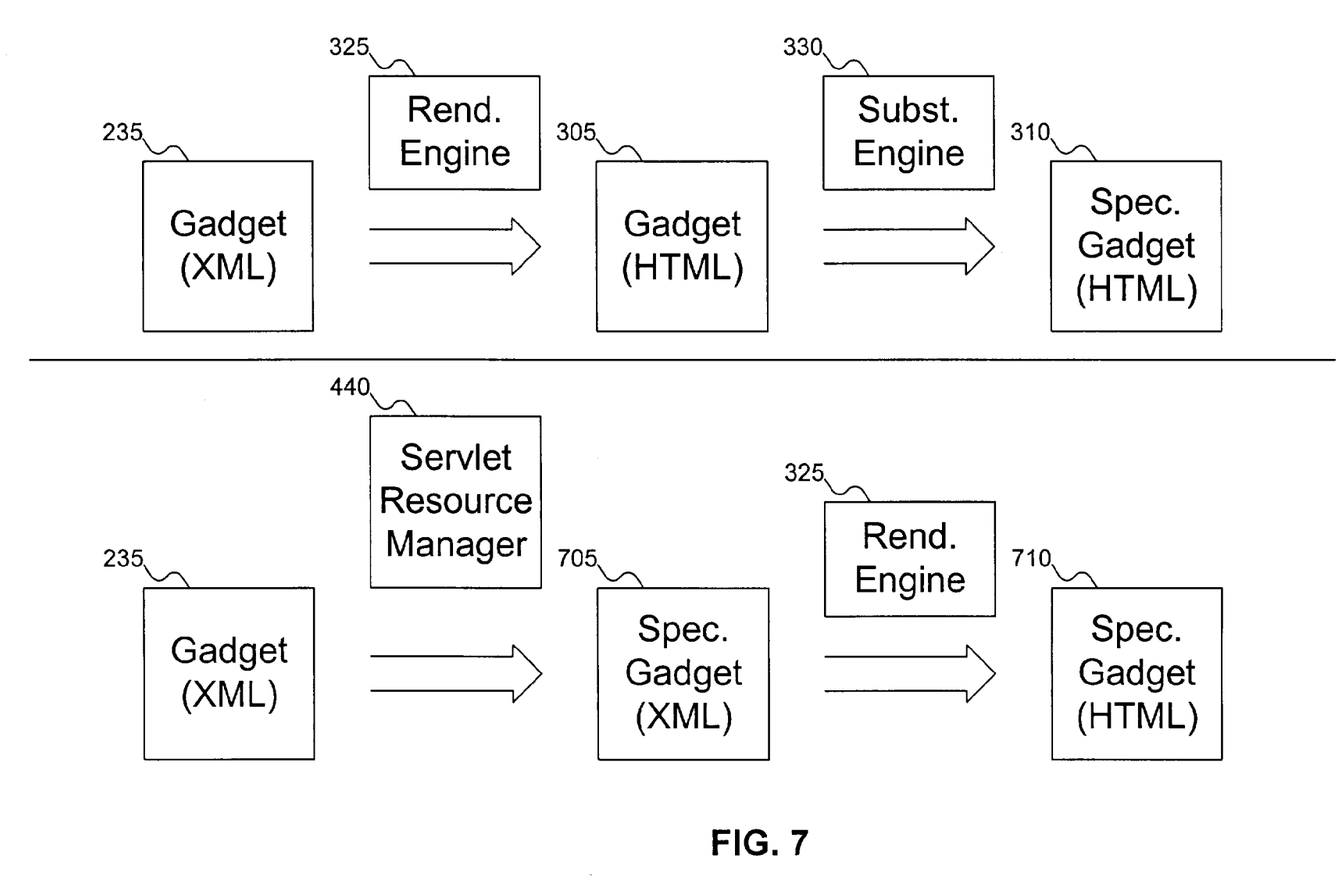
FIG. 7 compares the process of customizing the gadget of FIG. 5 in the prior art with customizing the gadget of FIG. 5 according to an embodiment of the invention.

FIG. 7 compares the process of customizing the gadget of FIG. 5 in the prior art with customizing the gadget of FIG. 5 according to an embodiment of the invention. In the prior art (recreated at the top of FIG. 7) gadget 235 is rendered by rendering engine 325, and then substitution engine 330 is applied. According to the invention, the process now involves using servlet resource manager 440 to replace values for variables in the XML code of gadget 235. Then, rendering engine 325 is applied to transform gadget 705, in XML, into gadget 710 in HTML.

Figure 8A:
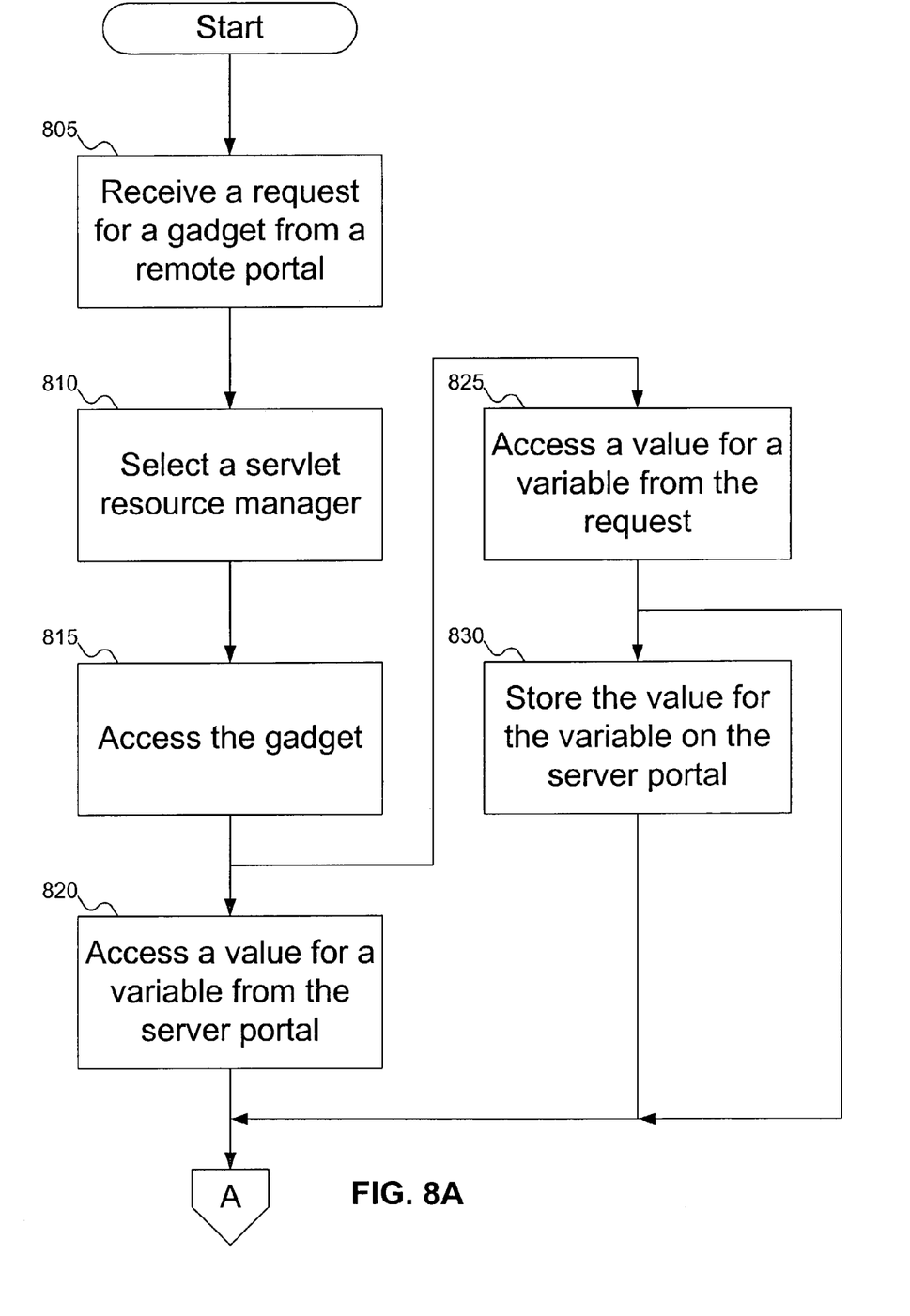
FIGS. 8A and 8B show a flowchart of the procedure for customizing content for a portal server as shown in FIGS. 4-6B, according to an embodiment of the invention.
Figure 8B:
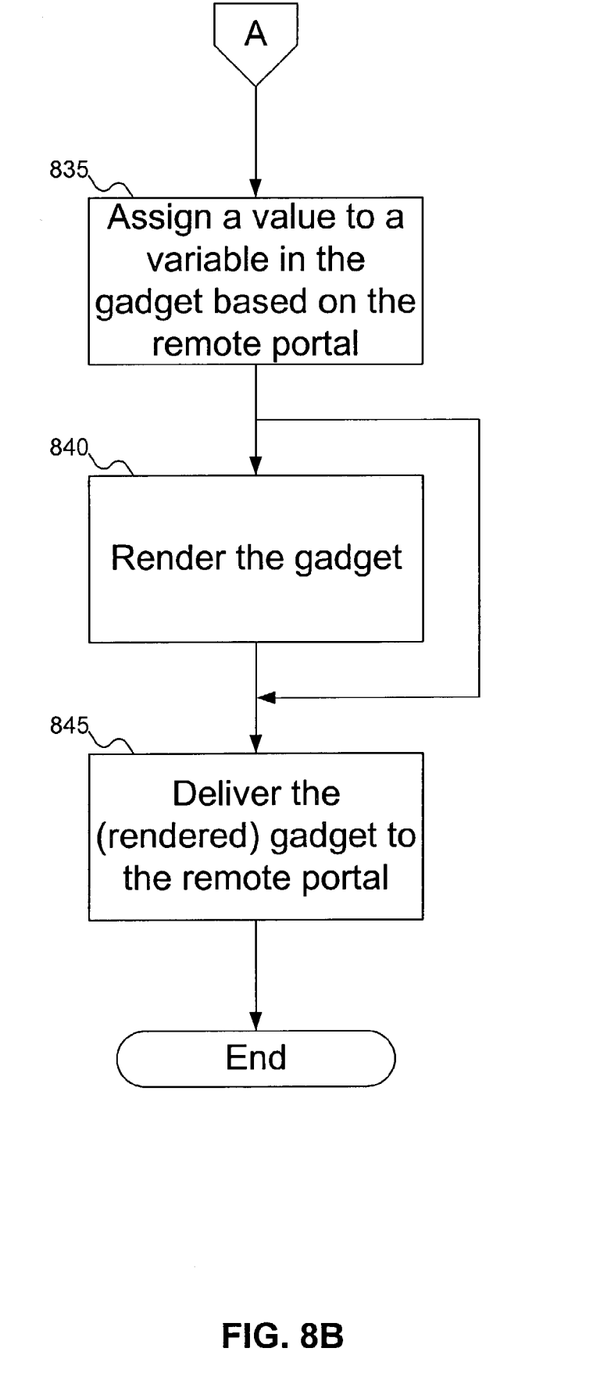

FIGS. 8A and 8B show a flowchart of the procedure for customizing content for a portal server as shown in FIGS. 4-6B, according to an embodiment of the invention. In FIG. 8A, at step 805 the gadget server receives a request from a portal server for a gadget. At step 810, a servlet resource manager is selected. At step 815, the gadget is accessed. At steps 820-830, the value(s) for variable(s) in the gadget for the portal server are accessed. This can be done in different ways, as described above with reference to FIG. 4. At step 820, the value(s) for the variable(s) are accessed from the gadget server. Alternatively, at step 825, the value(s) for the variable(s) are retrieved from the request. And optionally at step 830, the value(s) retrieved at step 825 can be stored on the gadget server, for use in a later request.

At step 835 (FIG. 8B), the value(s) are assigned to variable(s) in the gadget. At step 840, the gadget is rendered, and at step 845 the gadget is delivered to the portal server. A person skilled in the art will recognize that steps 840 and 845 can be done in either order, and that step 840 is optional (for example, if there is some way to display the gadget without rendering the gadget from XML to HTML).

Figure 1:
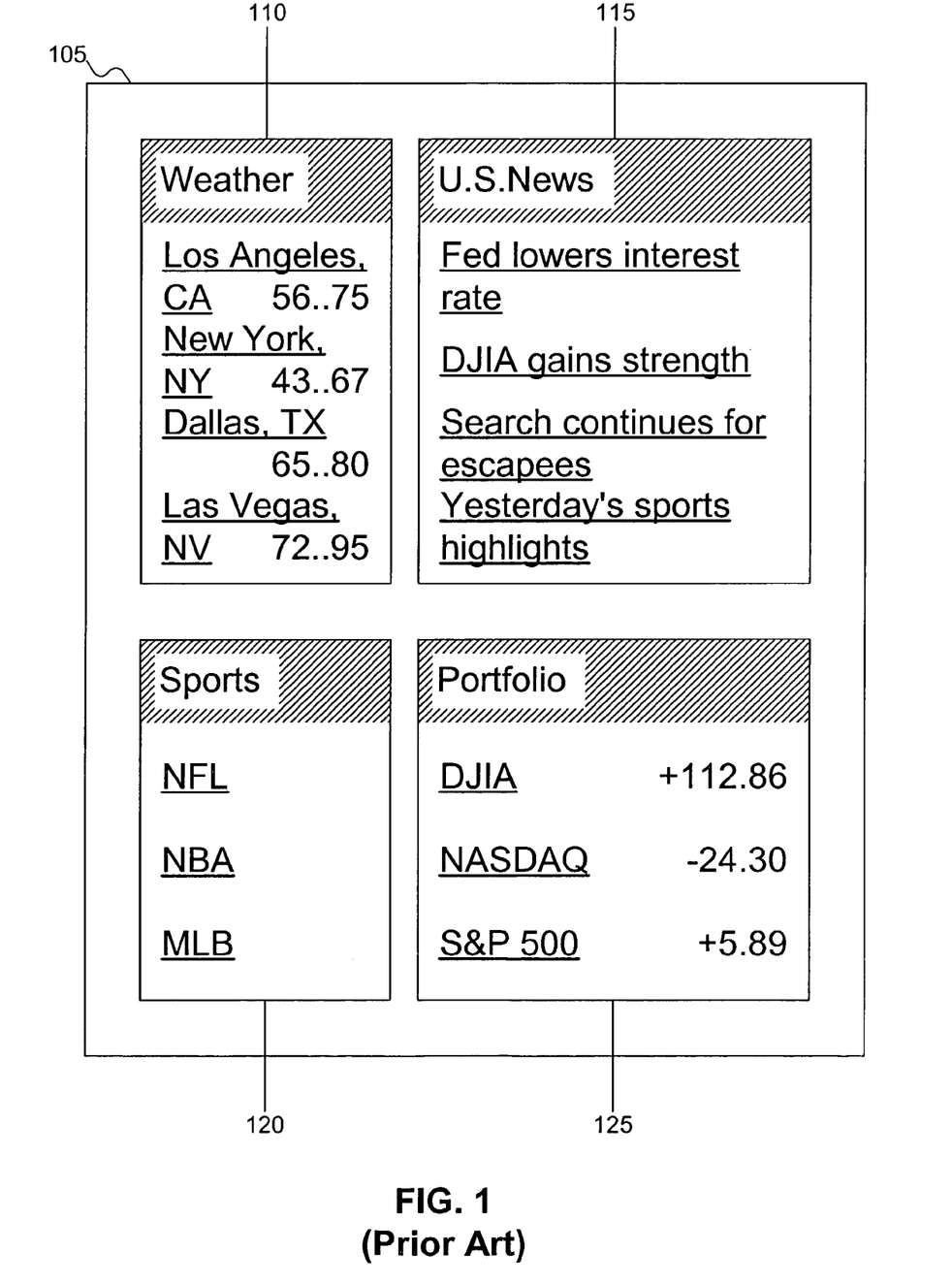
FIG. 1 shows the use of gadgets in displaying portal web pages to customers in the prior art.
Figure 9:
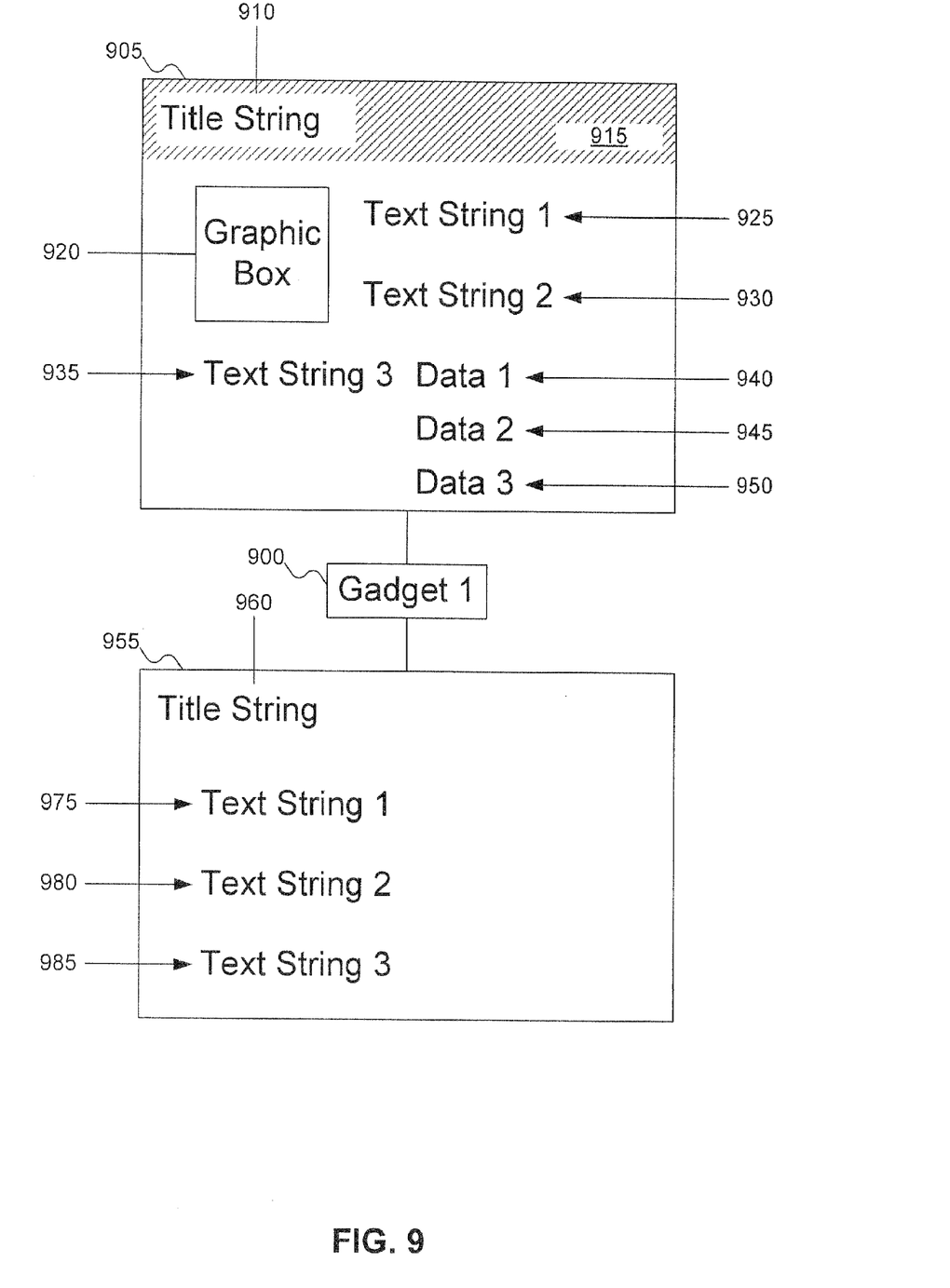
FIG. 9 shows one of the gadgets of FIG. 1 with two different layouts.

FIG. 9 shows one of the gadgets of FIG. 1 with two different layouts. In FIG. 9, layout information file (LIF) 905 specifies one layout for gadget 900, and LIF 955 specifies an alternative layout for gadget 900. (A layout information file is sometimes called a skin.) For example, LIF 905 might represent the default layout for gadget 900, whereas LIF 055 might represent a layout of gadget 900 for portable devices (where space is at a premium).

In layout information file 905, title string 910 provides a title for the gadget. For example, if gadget 900 is for Stocks, title string 910 can be "Portfolio," whereas if gadget 900 is for news, title string 910 can be "World News." Title string 910 is one example of a layout string (sometimes called a language string). Layout strings are strings that are displayed on the gadget that are language dependent. Rather than storing the string directly on the content page, LIF 905 stores a placeholder for a layout string, which can be pulled from a layout strings file for the specific language (see below with reference to FIG. 10 for more information). In that way, LIF 905 can be generally language-independent. Text strings 1 (925), 2 (930), and 3 (935) are additional examples of layout strings in LIF 905.

A person skilled in the art will recognize that there are times when LIFs can be language dependent. For example, some languages are displayed right-to-left (such as Hebrew, or Arabic). For these languages, a LIF that has the information displayed in a different presentation can be preferable.

Because content can be displayed in color, color stripe 915 can be behind title string 910. The color of color stripe 915 can be user-specified, or it can be specified by an administrator (in which case, the color is selected according to the same rules for all users).

Graphic box 920 enables the content provider to specify graphic images that are language-specific. For example, advertisements on content pages are typically stored as images, but include text. By enabling graphic images to be language-dependent and treating graphic box 920 as a layout string, the graphic images presented to the user can also be language-dependent. In addition, graphic images can be context-dependent, as symbols can be recognized by speakers of some languages but not other languages.

Data strings 1 (940), 2 (945), and 3 (950), in contrast to text strings 1 (925), 2 (930), and 3 (935), are not layout strings. Instead, data strings 1 (940), 2 (945), and 3 (950) are data that can vary depending on the time the content is displayed, and are usually language independent. For example, if LIF 905 shows, in part, stock price information, data string 1 (940), 2 (945), and 3 (950) can show the values for the Dow Jones Industrial Average, the NASDAQ, and the S&P 400. Or data strings 1 (940), 2 (945), and 3 (950) can represent the values of three particular stocks of interest to the user. A person skilled in the art will recognize other information that can be displayed in data strings 1 (940), 2 (945), and 3 (950). The values for the data strings are provided by a content provider.

Although the data strings are described above as being generally language independent, a person skilled in the art will recognize that the data strings can be localized as well. For example, the fractional portion of a decimal number is separated from the whole portion of the number by a decimal point (".") in the United States. But in other countries, a comma (",") is used. The gadget that generates the data can take advantage of the selected language to localize the data accordingly. Nevertheless, such data is not stored in a layout strings file, as the data can vary with time much more readily than the text strings.

A person skilled in the art will recognize that LIF 905 is exemplary, and not a required format. Thus, there can be more or fewer than four layout strings, nor does there have to be a title string. Data does not have to be displayed, nor do graphic images. Data can be presented in any format desired by the content provider. In short, LIF 905 merely shows one possible layout information file, of which there are nearly infinite arrangements.

For example, LIF 955 shows an alternative layout information file. LIF 955 can be for a portable device, on which display area is at a premium. Thus, although LIF 955 includes title string 960 and text strings 1 (975), 2 (980), and 3 (985), color is not used to highlight title string 960, nor are data strings 1 (940), 2 (945), and 3 (950) provided for.

Figure 10:
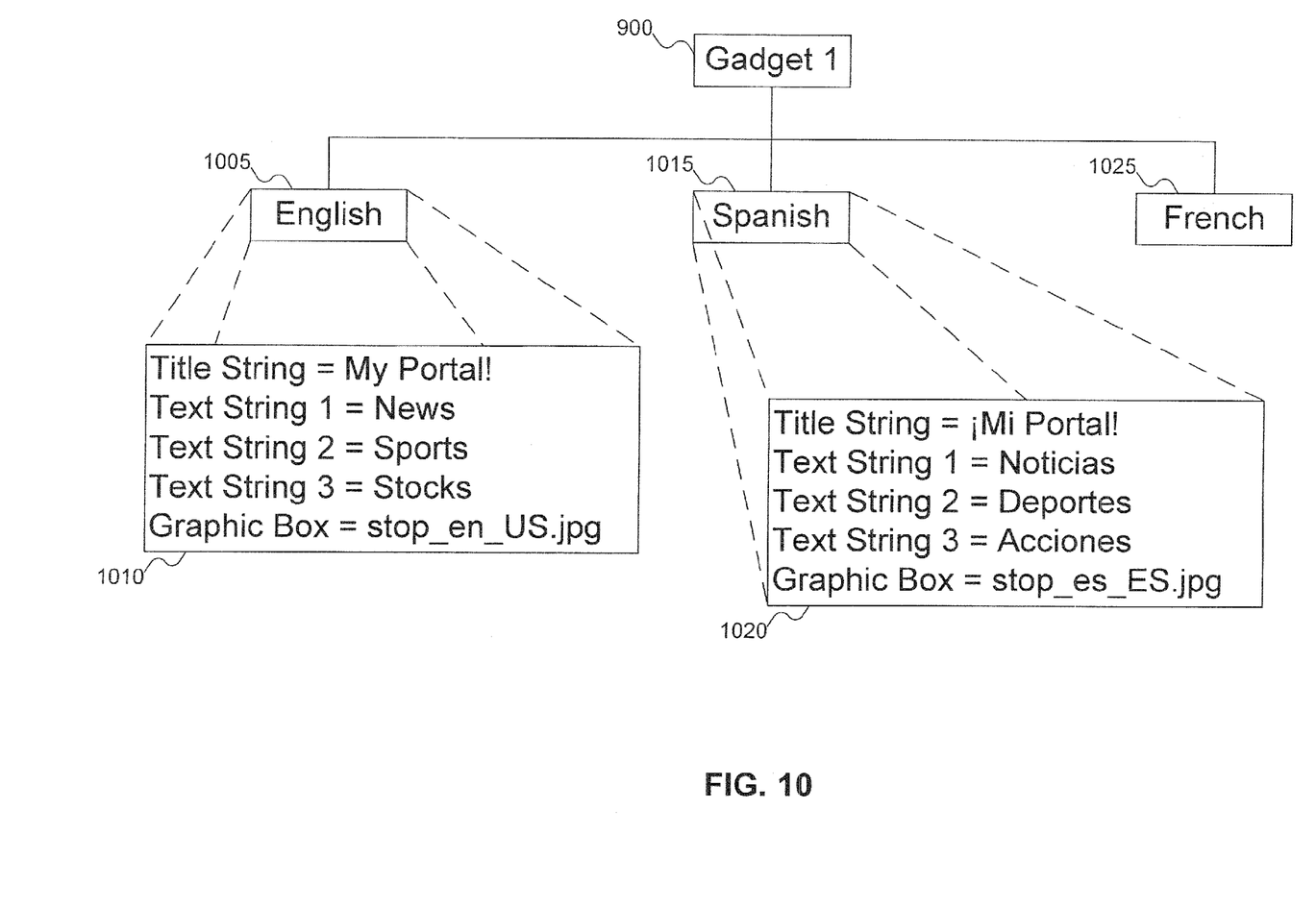
FIG. 10 shows the gadget of FIG. 9 with strings in two different languages.

FIG. 10 shows the gadget of FIG. 9 with strings in two different languages. In FIG. 10, English language 1005 for gadget 900 is expanded as layout strings file 1010. Layout strings file 1010 shows substitution strings for the title string, text strings 1, 2, and 3, and a particular graphic image to use in a graphic box. Similarly, layout strings file 1020 shows substitution strings for the title string, text strings 1, 2, and 3, and a particular graphic image to use in a graphic box for Spanish language 1015. (French language 1025 is not expanded for reasons of space in FIG. 10, but a person skilled in the art will recognize that similar strings in French can be placed in French language 1025.)

Returning to FIG. 1, it should be apparent how the invention addresses the problem of having a uniform appearance of gadgets. If gadgets 110-125 all come from different gadget servers, there is no guarantee that they appear consistent with each other, let alone with the appearance of the rest of content page 105 as presented by the portal web site. By using the invention, the gadgets can present a common appearance and look completely consistent with content page 105, as if the gadgets were stored on the portal server.

A person skilled in the art will recognize that an embodiment of the invention described above can be implemented using a suitably programmed computer. In that case, the method is embodied as instructions that make up a program and can be stored as associated data on a machine-accessible medium. The program may also be stored on computer-readable media or other machine-accessible media, such as floppy disks, optical discs (such as compact discs), or fixed disks (such as hard drives). The program can then be executed on a computer or other machine to implement the method. The program, or portions of its execution, can be distributed over multiple computers in a network.

Having illustrated and described the principles of the invention in a preferred embodiment thereof, it should be readily apparent to those skilled in the art that the invention can be modified in arrangement and detail without departing from such principles. All modifications coming within the spirit and scope of the accompanying claims are claimed.

The invention claimed is:

1. A computer-implemented method for dynamically delivering a gadget to a requestor, the method comprising:
   receiving a request for a gadget from a requestor, the gadget including at least one layout strings file and at least one layout information file, the gadget operative to display in a user designed web page;
   accessing the gadget on a gadget server;
   copying the gadget;
   assigning a value to a variable in the copy of the gadget, the value dependent on the requestor, including:
      determining that the variable is assigned an existing value in the copy of the gadget; and
      substituting the value for the existing value for the variable in the copy of the gadget; and
   delivering the copy of the gadget to the requestor.

2. The computer-implemented method according to claim 1, further comprising receiving the value from the requestor with the request for the gadget.

3. The computer-implemented method according to claim 1, further comprising:
   receiving the value from the requestor separately from the request for the gadget; and
   storing the value on the gadget server.

4. The computer-implemented method according to claim 3, wherein assigning a value to a variable includes accessing the value stored on the gadget server.

5. The computer-implemented method according to claim 1, wherein delivering the copy of the gadget includes rendering the copy of the gadget before delivery.

6. The computer-implemented method according to claim 1, further comprising rendering the copy of the gadget into HyperText Markup Language (HTML) code by the requestor.

7. The computer-implemented method according to claim 1, further comprising selecting a servlet resource manager on the gadget server to assign the value to the variable.

8. The computer-implemented method according to claim 7, wherein selecting a servlet resource manager includes selecting the servlet resource manager identified by the requestor.

9. The computer-implemented method according to claim 1, wherein:
   receiving a request for a gadget from a requestor includes receiving the request for the gadget from a portal server;
   assigning a value to a variable in the copy of the gadget, the value dependent on the requestor includes assigning the value to the variable in the copy of the gadget, the value dependent on the portal server; and
   delivering the copy of the gadget to the requestor includes delivering the copy of the gadget to the portal server.

10. An article comprising a machine-accessible storage medium having associated data that, when accessed, results in a machine:
   receiving a request for a gadget identified in the code of a user designed web page from a portal server, the gadget including at least one layout strings file and at least one layout information file;
   accessing the gadget on a gadget server;
   copying the gadget;
   assigning a value to a variable in the copy of the gadget, the value dependent on the portal server, including:
      determining that the variable is assigned an existing value in the copy of the gadget; and
      substituting the value for the existing value for the variable in the copy of the gadget; and
   delivering the copy of the gadget to the portal server.

11. The article according to claim 10, the machine-accessible medium having further associated data that, when accessed, results in the machine selecting a servlet resource manager on the gadget server to assign the value to the variable.

12. The article according to claim 11, wherein selecting a servlet resource manager includes selecting the servlet resource manager identified by the portal server.

13. The article according to claim 10, the machine-accessible medium having further associated data that, when accessed, results in the machine receiving the value from the portal server with the request for the gadget.

14. The article according to claim 10, the machine-accessible medium having further associated data that, when accessed, results in the machine:
   receiving the value from the portal server separately from the request for the gadget; and
   storing the value on the gadget server.

15. The article according to claim 14, wherein assigning a value to a variable includes accessing the value stored on the gadget server.

16. The article according to claim 10, wherein delivering the copy of the gadget includes rendering the copy of the gadget before delivery.

17. The article according to claim 10, the machine-accessible medium having further associated data that, when accessed, results in the machine rendering the copy of the gadget into HyperText Markup Language (HTML) code by the portal server.

\* \* \* \* \*